United States Patent
Jessenig et al.

(10) Patent No.: US 8,471,490 B2
(45) Date of Patent: Jun. 25, 2013

(54) CIRCUIT ARRANGEMENT AND METHOD FOR VOLTAGE CONVERSION

(75) Inventors: Thomas Jessenig, Graz (AT); Manfred Lueger, Preding (AT)

(73) Assignee: AMS AG, Unterpremstaetten (AT)

( * ) Notice: Subject to any disclaimer, the term of this patent is extended or adjusted under 35 U.S.C. 154(b) by 680 days.

(21) Appl. No.: 12/302,278

(22) PCT Filed: May 24, 2007

(86) PCT No.: PCT/EP2007/004632
§ 371 (c)(1),
(2), (4) Date: Jun. 17, 2009

(87) PCT Pub. No.: WO2007/134871
PCT Pub. Date: Nov. 29, 2007

(65) Prior Publication Data
US 2009/0284178 A1 Nov. 19, 2009

(30) Foreign Application Priority Data
May 24, 2006 (DE) .......................... 10 2006 024 422

(51) Int. Cl.
*H05B 41/36* (2006.01)
(52) U.S. Cl.
USPC ........................................................ 315/291
(58) Field of Classification Search
USPC ....................... 315/297, 291, 77, 121; 307/82
See application file for complete search history.

(56) References Cited

U.S. PATENT DOCUMENTS

| 6,734,639 | B2 * | 5/2004 | Chang et al. | 315/291 |
|---|---|---|---|---|
| 6,756,771 | B1 * | 6/2004 | Ball et al. | 323/222 |
| 6,844,760 | B2 * | 1/2005 | Koharagi et al. | 327/110 |
| 6,864,641 | B2 * | 3/2005 | Dygert | 315/216 |
| 6,909,249 | B2 | 6/2005 | Otake | |
| 2004/0119451 | A1 * | 6/2004 | Otake | 323/274 |
| 2004/0183380 | A1 | 9/2004 | Otake | |
| 2004/0208011 | A1 | 10/2004 | Horiuchi et al. | |
| 2004/0212420 | A1 | 10/2004 | Otake | |
| 2004/0251854 | A1 | 12/2004 | Matsuda et al. | |

(Continued)

FOREIGN PATENT DOCUMENTS

| DE | 10 2004 008 896 | 9/2004 |
|---|---|---|
| EP | 1 322 139 | 6/2003 |
| EP | 1 560 321 | 8/2005 |
| JP | 2001-134208 | 5/2001 |

OTHER PUBLICATIONS

L. Sherman, "Logic Power Drives High-Intensity LEDs", Electronic Design, vol. 45, No. 23, pp. 142, Oct. 23, 1997.

*Primary Examiner* — Douglas W Owens
*Assistant Examiner* — Amy Yang
(74) *Attorney, Agent, or Firm* — McDermott Will & Emery LLP

(57) ABSTRACT

A circuit arrangement (1) for voltage conversion comprises a forward branch (60) with a first load terminal (45) to which an electrical load (47) can be coupled and a feedback branch (61) with a sampling device (30). The electrical load (47) can be operated with pulse width modulation. A method for voltage conversion comprises the following steps: an electrical load (47) is supplied with energy using pulse width modulation. A feedback voltage (Vfb) that can be tapped at a terminal of the electrical load (47) is sampled in a first clock phase during which the electrical load (47) is supplied with energy. The voltage conversion is controlled as a function of the feedback voltage (Vfb).

23 Claims, 3 Drawing Sheets

U.S. PATENT DOCUMENTS

| | | |
|---|---|---|
| 2005/0002134 A1 | 1/2005 | Ohtake et al. |
| 2005/0007085 A1* | 1/2005 | Murakami .................... 323/282 |
| 2005/0128168 A1* | 6/2005 | D'Angelo ....................... 345/82 |
| 2006/0001381 A1 | 1/2006 | Robinson et al. |
| 2006/0022607 A1 | 2/2006 | Hsu |
| 2006/0082397 A1 | 4/2006 | Chang |
| 2006/0082529 A1 | 4/2006 | Oyama |
| 2006/0097705 A1 | 5/2006 | Cheung et al. |

* cited by examiner

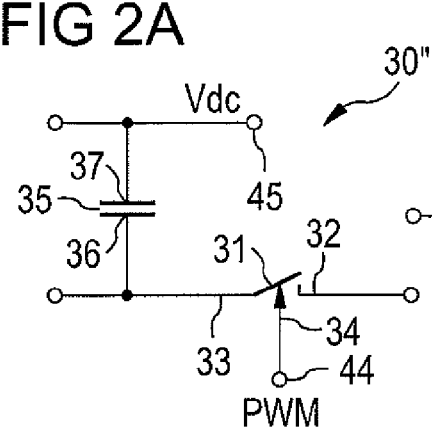
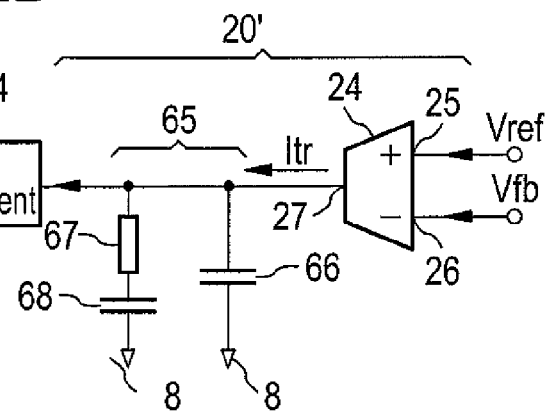
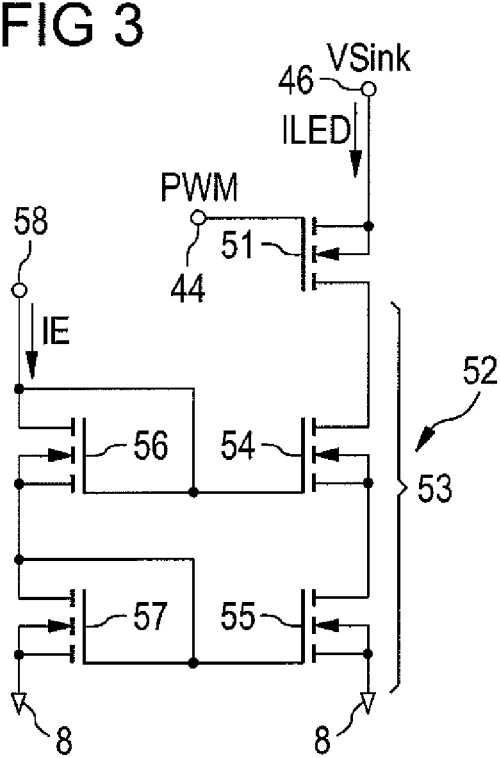
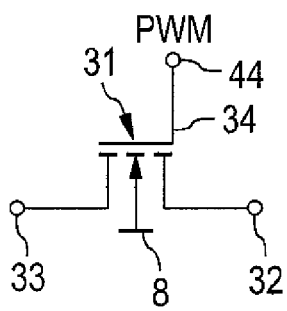
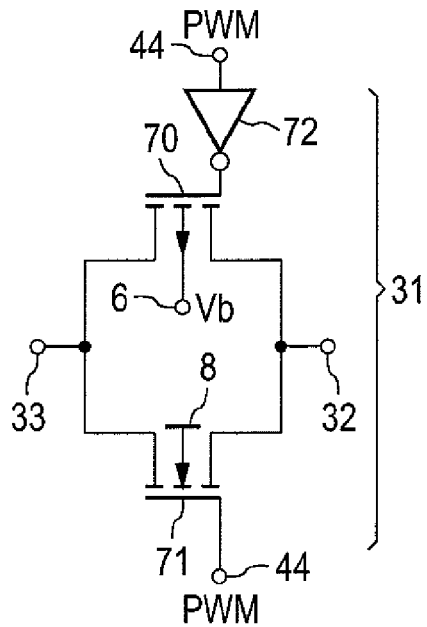

US 8,471,490 B2

CIRCUIT ARRANGEMENT AND METHOD FOR VOLTAGE CONVERSION

RELATED APPLICATIONS

This is a U.S. national stage under 35 USC §371 of application No. PCT/EP2007/004632, filed on May 24, 2007.

This application claims the priority of German application nos. 10 2006 024 422.2 filed May 24, 2006 the entire content of which is hereby incorporated by reference.

FIELD OF THE INVENTION

The present invention relates to a circuit arrangement for voltage conversion, a voltage converter, a use of a voltage converter, and a method for voltage conversion.

BACKGROUND OF THE INVENTION

Circuit arrangements for powering electrical loads are used, for example, in devices of mobile communications and in cameras. They are used, among other things, for powering light-emitting diodes, abbreviated LEDs.

SUMMARY OF THE INVENTION

One object of the present invention is to provide a circuit arrangement for voltage conversion, a voltage converter, and a method for voltage conversion that guarantee high flexibility in powering an electrical load.

According to one embodiment of the invention, a circuit arrangement for voltage conversion comprises a forward branch and a feedback branch that is coupled to the forward branch. The forward branch has a first load terminal. An electrical load can be connected to the first load terminal. The feedback branch comprises a sampling device. The sampling device is designed for sampling a voltage that can be tapped at the electrical load. The electrical load can be supplied with electrical energy using pulse width modulation.

By means of the forward branch of the circuit arrangement, an output voltage is provided on the first load terminal. Based on the pulse width-modulated operation of the electrical load, the energy that is output from the forward branch of the circuit arrangement to the electrical load also has a pulse width-modulated form. By means of the sampling device in the feedback branch, a time point can be set at which a voltage that can be tapped at the electrical load is sampled and is provided from the feedback branch to the forward branch for controlling the voltage conversion.

Advantageously, the sampling device can set a clock phase and a time point in the clock phase at which the signal that can be tapped at the electrical load is sampled, so that information that is independent as a first approximation of the two clock phases of the pulse width-modulated operation of the electrical load is provided from the feedback branch to the forward branch.

In one embodiment, the sampling device comprises a first switch that is connected at a first terminal to the first load terminal or to a second load terminal. Accordingly, the output voltage or a voltage that can be tapped on the second load terminal can be fed to the first terminal of the first switch. The second load terminal is used like the first load terminal for connecting the electrical load. The electrical load can be arranged between the first and the second load terminal.

The circuit arrangement can be provided for operating at least one light-emitting diode as an electrical load. Advantageously, a brightness that the LED provides can be set by means of the pulse duty ratio. Here, there can be a linear relationship between the brightness and the pulse duty ratio. Advantageously, the light-emitting diode is operated in an activated phase of the pulse width-modulated operation with the same current, so that the colour spectrum of the light-emitting diode does not change when the brightness changes. Advantageously, for example, frequencies above 20 kHz can be used for the pulse width-modulated operation, because such frequencies do not generate audible mechanical vibrations in components of a system, such as, for example, a device for mobile communications. Advantageously, based on the sampling device in the feedback branch, a signal that is provided to the forward branch for control is approximately independent of the frequency of the pulse width modulation.

In one embodiment, in the sampling device a first switch is realized that has a first and a second terminal and is connected at the first terminal to a terminal of the electrical load. The first switch has a control terminal that is connected to a clock input of the circuit arrangement. The clock input is provided for feeding a pulse width-modulated clock signal to the circuit arrangement. The first switch can be constructed as a bipolar transistor. Alternatively, the first switch can be realized as a metal-oxide-semiconductor field-effect transistor, abbreviated MOSFET. The first switch can be constructed as a p-channel MOSFET. Advantageously, the first switch is constructed as an n-channel MOSFET. In one especially preferred embodiment, the first switch is realized as a transmission gate and has a parallel circuit of an n-channel and a p-channel MOSFET.

The sampling device can be realized as a sample-hold circuit and can comprise a hold element.

Advantageously, the sampling device has a first capacitor. One electrode of the first capacitor is connected to a second terminal of the first switch.

In one embodiment, another electrode of the first capacitor is connected to a reference-potential terminal.

In one alternative embodiment, the other electrode of the first capacitor is connected to the first load terminal. In another embodiment, the other electrode of the first capacitor is coupled to the first load terminal. A second capacitor can be provided that connects the other electrode of the first capacitor to the first load terminal. Thus, advantageously a voltage jump to the output voltage is fed via the first or via the first and the second capacitor to the second terminal of the first switch.

In one embodiment, the feedback branch comprises an amplifier that is connected at a second input to the second terminal of the first switch. One output of the amplifier is connected to the forward branch. A reference voltage can be fed to a first input of the amplifier. A signal at the output of the amplifier can be provided as a function of a difference in the signals at the first and the second input of the amplifier. The amplifier can be realized as a differential amplifier that amplifies a difference in the two applied input voltages and provides an analog signal at the output of the amplifier. The amplifier can be provided as a voltage feedback operational amplifier. Alternatively, the amplifier can be constructed as a comparator and can provide a digital signal at the output. In another alternative embodiment, the amplifier can be realized as an operational transconductance amplifier, abbreviated OTA.

In one embodiment, the feedback branch has a current-sink arrangement that is coupled via a second load terminal to the electrical load. The current-sink arrangement is designed to modulate a load current flowing through the electrical load in pulse width form. The electrical load can be arranged between the first load terminal and the second load terminal. In one embodiment, the first terminal of the first switch is connected to the second load terminal. The current-sink arrangement can be connected to the clock input. The current-sink arrangement operated with pulse width modulation and the electrical load can be connected in series between the first load terminal and the reference-potential terminal.

Preferably, in the current-sink arrangement there is a current-sink switch that is connected to the clock input of the circuit arrangement for feeding the pulse width-modulated clock signal. The current-sink arrangement can have a resistor that is connected in series to the current-sink switch, so that a series circuit comprising the resistor and the current-sink switch connects the second load terminal to the reference-potential terminal.

In one embodiment, the current-sink arrangement has a MOSFET that is activated or deactivated by means of a control voltage on a control terminal according to the pulse width-modulated clock signal. A value for the load current can be set by means of a value of the control voltage in the activated phase of the clock signal.

Advantageously, the current-sink arrangement comprises a current mirror. In one embodiment, the current mirror of the current-sink arrangement comprises the current-sink switch.

In one embodiment, the forward branch can comprise a voltage converter that is connected on the output side to the first load terminal. The voltage terminal can be connected on the input side to the feedback branch.

In one embodiment, the forward branch can be provided for voltage conversion of an alternating-current voltage into a direct-current voltage. In another embodiment, the forward branch is used for down conversion of a direct-current voltage. In a preferred embodiment, the forward branch is constructed for up conversion of a direct-current voltage.

The forward branch comprises an input for coupling to a power source. The forward branch can have a control switch that is connected at a first terminal to the input and at a second terminal to the reference-potential terminal. The forward branch can have a control arrangement that is connected between the feedback branch and a control terminal of the control switch.

A period length of a control signal that is fed to the control terminal of the control switch can be independent of a period length of the pulse width-modulated clock signal. A period length of the control signal can be different from a period length of the pulse width-modulated clock signal. The pulse width-modulated clock signal thus can advantageously have a shorter period length and thus a higher frequency than the control signal. Thus, an electrical load can be supplied with a voltage that has only few frequency components in an audible spectrum comprising frequencies less than twenty kilohertz.

In an alternative embodiment, the pulse width-modulated clock signal can have a longer period length and thus a lower frequency than the control signal. Therefore, interference signals can be easily filtered. In addition, high electromagnetic compatibility of the circuit arrangement can be achieved. In one refinement, the frequency of the pulse width-modulated clock signal can be derived from the frequency of the control signal by means of a frequency divider.

In one embodiment, the forward branch has a diode that couples the input of the circuit arrangement to the first load terminal. Preferably, the diode is constructed as a Schottky diode and exhibits a low conduction voltage. Alternatively, the forward branch has a second switch for coupling the input of the circuit arrangement to the first load terminal. The second switch can be realized as a MOSFET.

The circuit arrangement can be realized on a semiconductor body. For fabricating the circuit arrangement on the semiconductor body, bipolar integration technology can be used. For fabricating the circuit arrangement on the semiconductor body, preferably complementary metal-oxide-semiconductor integration technology, abbreviated CMOS integration technology, is used.

In one embodiment according to the proposed principle, a voltage converter comprises the circuit arrangement and an inductor that connects a power source to the input of the circuit arrangement. In one embodiment, the electrical load can have a light-emitting diode. Alternatively, the electrical load can comprise several light-emitting diodes connected in series.

The voltage converter can be used for a display or lighting device. The voltage converter can be used as a direct-current/direct-current converter, abbreviated DC/DC converter.

According to the invention, a method for voltage conversion provides the following steps: electrical energy is provided to an electrical load using pulse width modulation. A feedback voltage that can be tapped at a terminal of the electrical load is sampled. The sampling takes place in a first clock phase during which the electrical load is supplied with electrical energy. The value of the feedback voltage that can be tapped at the end of the first clock phase is held in a second clock phase. During the second clock phase, the electrical load is not supplied with electrical energy. A voltage conversion is controlled as a function of the feedback voltage. Electrical energy for the electrical load is provided by means of the voltage conversion.

Advantageously, for controlling the voltage conversion, only one signal is used that can be tapped during the operation of the electrical load. Advantageously, for the control of the voltage conversion, the clock phase in which the pulse width-modulated electrical load consumes no electrical energy is not taken into account.

For supplying the electrical load with electrical energy, an output voltage can be provided that can be fed to the electrical load.

In one embodiment, the value of the sampled feedback voltage in the second clock phase can be increased, as long as the output voltage in the second clock phase is increased. If the output voltage in the second clock phase is not increased, then the value of the feedback voltage that can be tapped at the end of the first clock phase can be held in the second clock phase. For an approximately constant output voltage in the second clock phase, advantageously the value of the feedback voltage that can be tapped at the end of the first clock phase can be held in the second clock phase.

In one embodiment, the value of the feedback voltage can be detected with reference to a potential of a reference-potential terminal in the first clock phase. In the second clock phase, in the case that the output voltage increases with reference to the potential of the reference-potential terminal, the value of the feedback coupling voltage can also be increased with reference to the potential of the reference-potential terminal.

In one refinement, the value of the feedback voltage in the second clock phase is increased approximately by the value that the output voltage of the voltage converter increases.

In one refinement, the feedback voltage is not sampled in each first clock phase, but instead sampling is performed in every second of the first clock phases. Alternatively, the sampling is performed in every n-th first clock phase.

In one embodiment, during the entire first clock phase, the electrical load is supplied with energy and the feedback voltage is tapped at the terminal of the electrical load. In another embodiment, a time span during which the feedback voltage is tapped can be smaller than a time span of the first clock phase, but can lie within the first clock phase.

In one embodiment, the feedback voltage that can be tapped at the terminal of the electrical load in the first clock phase can be a sink voltage or the output voltage. Thus, the feedback voltage can be generated by means of sampling the sink voltage or the output voltage in the first clock phase.

BRIEF DESCRIPTION OF THE DRAWINGS

The invention will be explained below in more detail using several embodiments with reference to the figures. Components that have identical functions or effect carry identical reference symbols. Insofar as circuit parts or components correspond in their function, their description will not be repeated in each of the following figures.

FIG. 2A shows another example embodiment of a sampling device, FIG. 2B shows another example embodiment of an amplifier, FIG. 3 shows an example embodiment of a current-sink arrangement, and FIGS. 4A and 4B show example embodiments of a first switch.

DETAILED DESCRIPTION OF THE DRAWINGS

Figure 1A:
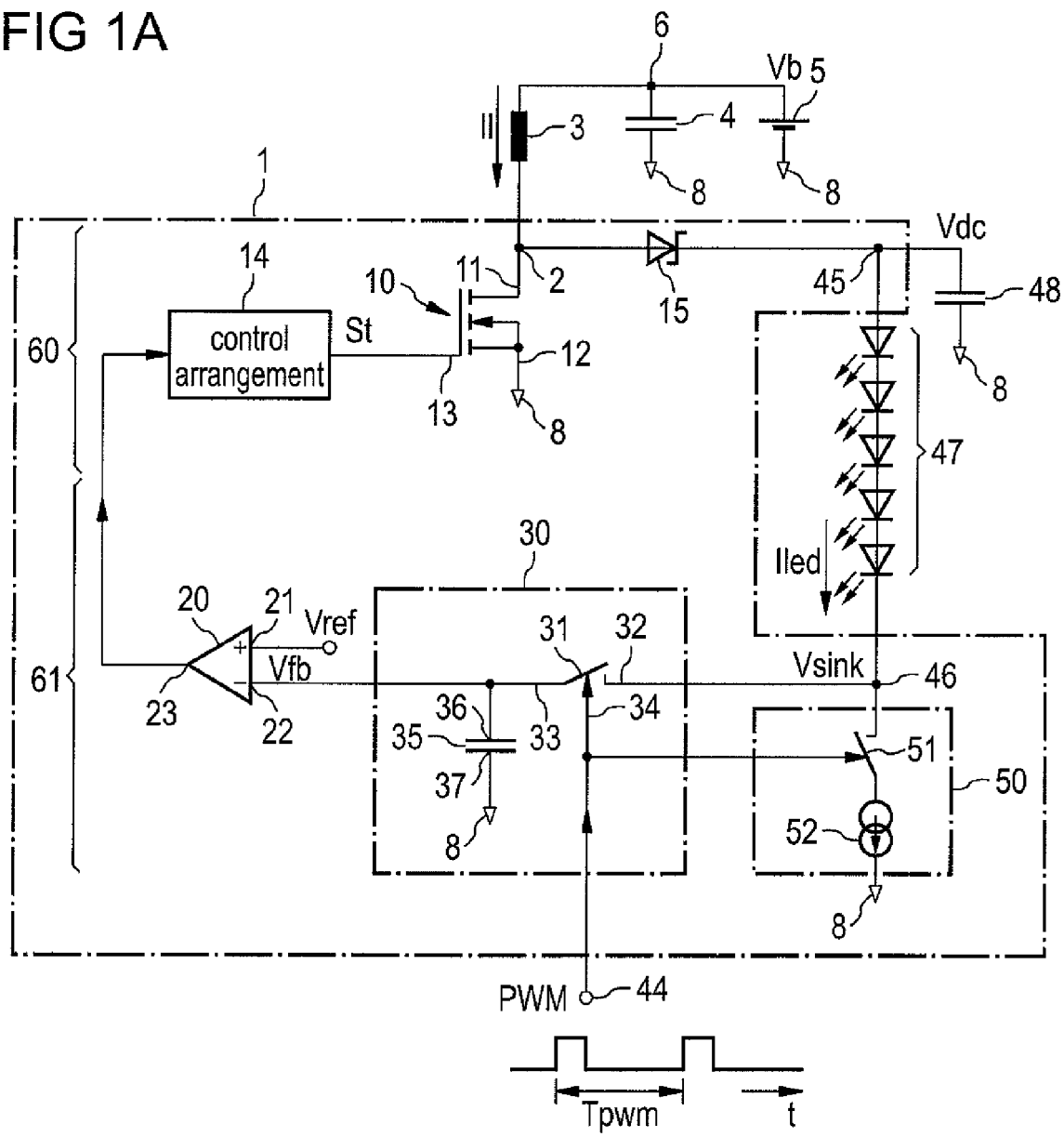
FIGS. 1A and 1B show example embodiments of a circuit arrangement for voltage conversion according to the invention.

FIG. 1A shows an example embodiment of a circuit arrangement for voltage conversion according to the invention. The circuit arrangement 1 comprises a forward branch 60 and a feedback branch 61. The feedback branch 61 has a current-sink arrangement 50. After this current-sink arrangement, a sampling device 30 is connected. After this sampling device, in turn, an amplifier 20 is connected. The feedback branch 61 is coupled on the output side to the forward branch 60. The forward branch 60 has a control arrangement 14 that is coupled on the input side to the feedback branch 61. After this control arrangement, a control switch 10 is connected.

In one embodiment, control arrangement 14 comprises digital logic gates and a driver. The digital logic gates determine, for example, a time duration of a pulse of the control signal St and a time duration between successive pulses. An output of the digital logic gates is connected to the driver. The driver can be implemented in one embodiment as an analog driver circuit that generates the control signal St.

In an alternative embodiment, control arrangement 14 comprises a microcontroller. A core of the microcontroller can be integrated in the semiconductor body of which circuit arrangement 1 can be comprised. The microcontroller can be, for example, a 8051 microcontroller from Motorola.

After control switch 10, in turn, a diode 15 is connected. One terminal of the diode 15 is connected to a first load terminal 45. An electrical load 47 is arranged between the first load terminal 45 and a second load terminal 46. One terminal of the electrical load 47 is connected to the second load terminal 46. In this embodiment, the electrical load 47 comprises five light-emitting diodes that are connected to each other in series.

The second load terminal 46 is connected via the current-sink arrangement 50 to a reference-potential terminal 8. The current-sink arrangement 50 has a current-sink switch 51 and a current source 52 that are connected to each other in series and between the second load terminal 46 and the reference-potential terminal 8. A control terminal of the current-sink switch 51 is connected to a clock input 44 of the circuit arrangement 1. The sampling device 30 has a first switch 31 that is coupled at a first terminal 32 to the second load terminal 46, at a second terminal 33 via a first capacitor 35 to the reference-potential terminal 8, and at a control terminal 34 to the clock input 44 of the circuit arrangement 1. The second terminal 33 of the first switch 31 is connected to a second input 22 of the amplifier 20. The amplifier 20 is connected at an output 23 to the control arrangement 14. The control switch 10 is realized as an n-channel MOSFET and comprises a control terminal 13 that is connected to the control arrangement 14, a first terminal 11 that is connected to an input 2 of the circuit arrangement 1 and to another terminal of the diode 15, and a second terminal 12 that is connected to the reference-potential terminal 8. The diode 15 couples the input 2 of the circuit arrangement 1 to the first load terminal 45. A first support capacitor 48 is connected to the first load terminal 45. The input 2 of the circuit arrangement 1 is connected via an inductor 3 to a power source 5. A second support capacitor 4 is connected to the power source 5. The inductor 3 is constructed as a coil.

At the clock input 44, a pulse width-modulated signal PWM is fed to the circuit arrangement 1. The pulse width-modulated signal PWM has a period length Tpwm. In a first clock phase, the current-sink switch 51 is closed, so that a load current Iled that is set by means of the current source 52 flows through the electrical load 47. A current-sink voltage Vsink can be tapped at the second load terminal 46. The current-sink voltage Vsink thus falls across the current-sink arrangement 50. The current-sink voltage Vsink is fed to the first terminal 32 of the first switch 31. During the first clock phase, the first switch 31 is also closed, so that the sink voltage Vsink is fed via the first switch 31 as feedback voltage Vfb to the second input 22 of the amplifier 20 and is applied to the first capacitor 35. In a second clock phase, the current-sink switch 51 and the first switch 31 are open. Thus, the load current Iled that flows in the second clock phase through the electrical load 47 has the value null. Because the first switch 31 is switched open in the second clock phase, an increase of the sink voltage Vsink on the second load terminal 46 has no effect on the control of the circuit arrangement 1. By means of the first capacitor 35, a value of the feedback voltage Vfb that was applied at the end of the first clock phase on the first capacitor 35 is held during the second clock phase. Because an input resistor of the second terminal 22 of the amplifier 20 and an input resistor of the second terminal 33 of the first switch 31 have very high values, the feedback voltage Vfb during the second clock phase falls only slightly. A reference voltage Vref is fed to the first terminal 21 of the amplifier 20.

A signal that is prepared by means of the amplifier 20 and that is prepared as a function of the difference in the reference voltage Vref and the feedback voltage Vfb is fed to the control arrangement 14. If the feedback voltage Vfb falls below the reference voltage Vref, then the control arrangement 14 controls the control switch 10 by means of a control signal St so that it is switched to a conducting state. Thus, a charge current I1 can flow from the power source 5 via the inductor 3 and the control switch 10 to the reference-potential terminal 8. Thus electrical energy is stored in the inductor 3. After an adjustable time elapses during which the control switch 10 is closed, the control switch 10 is opened. In a subsequent phase during which the control switch 10 is open, the charge current I1 flows through the diode 15 instead of through the control switch 10, and charges the first support capacitor 48. At the first support capacitor 48, an output voltage Vdc of the circuit arrangement 1 can be tapped. By means of the output voltage Vdc, the electrical load 47 and the current-sink arrangement 50 are supplied with electrical energy.

Thus, energy is advantageously stored in the first support capacitor 48 primarily when the sink voltage Vsink is below the value of the reference voltage Vref during the first clock phase. The first support capacitor 48 is thus charged independent of the period length Tpwm and also the period of the first and the period of the second clock phase of the pulse width-modulated signal PWM. Opening the current-sink switch 51 can result in an increase in the current-sink voltage Vsink nearly up to the value of the output voltage Vdc. Therefore, advantageously, the first switch 31 is also open as long as the current-sink switch 51 is open. In this way it is avoided that charging of the first support capacitor 48 in the second clock phase is stopped, although the charging for supplying the electrical load 47 in the following first clock phase is desired.

In an alternative, not-shown embodiment, the first terminal 32 of the first switch 31 is connected at the first load terminal 45. According to this embodiment, the connection of the first terminal 32 of the first switch 31 to the second load terminal 46 is unnecessary. The terminal of the electrical load 47 can be connected to the first load terminal 45. Thus, the output voltage Vdc is fed to the first terminal 32 of the first switch 31. The feedback voltage Vfb is therefore formed as a function of the output voltage Vdc.

Figure 1B:
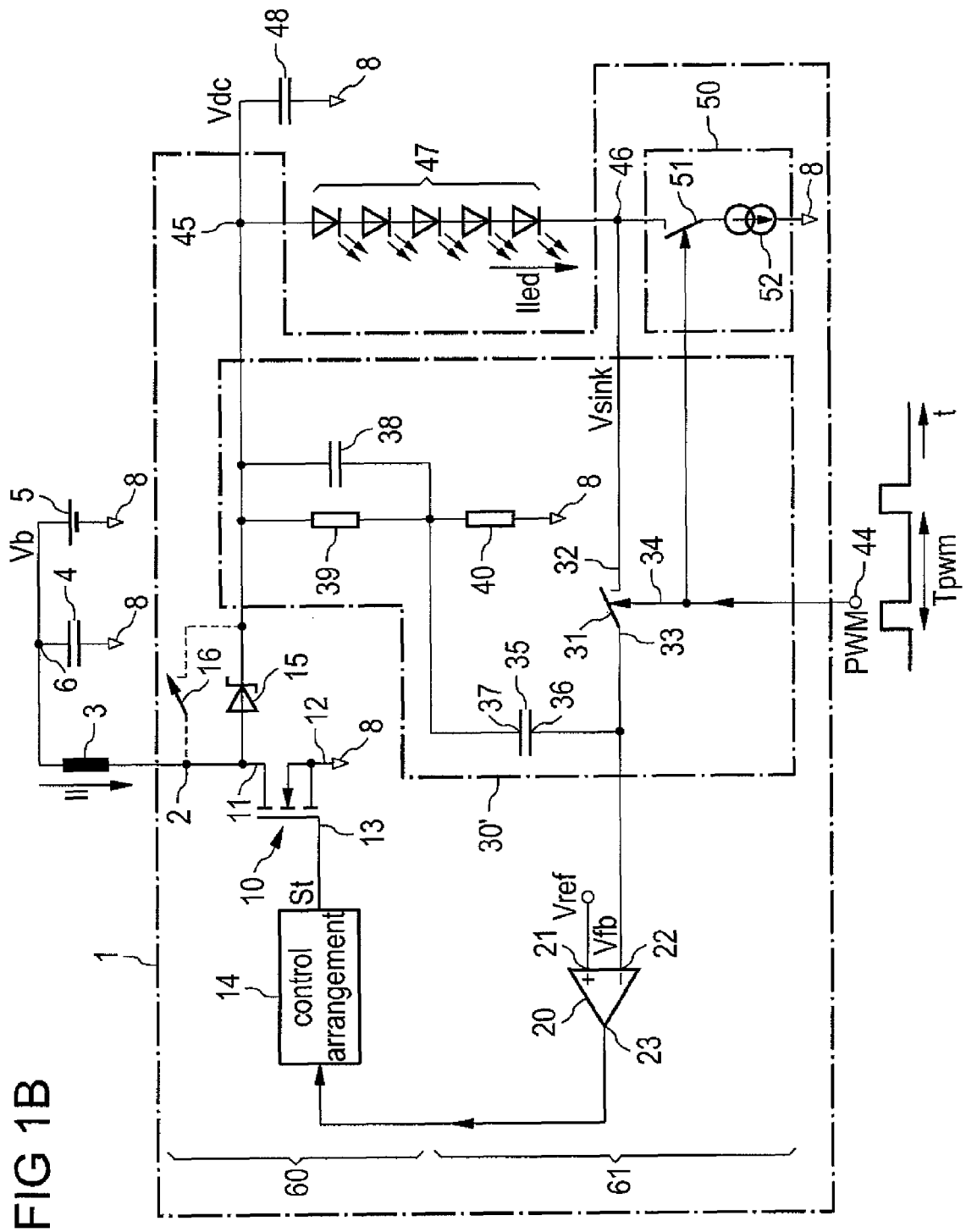

FIG. 1B shows an improvement in the circuit arrangement 1 according to FIG. 1A. According to FIG. 1B, the sampling device 30' has the first switch 31 and the first capacitor 35 that is connected at a first electrode 36 to the second terminal 33 of the first switch 31. In contrast to FIG. 1A, in the circuit arrangement 1 according to FIG. 1B, a second electrode 37 of the first capacitor 35 is coupled to a node that is connected via a second capacitor 38 and a first resistor 39 to the first load terminal 45 and via a second resistor 40 to the reference-potential terminal 8.

As in the circuit arrangement according to FIG. 1A, the pulse width-modulated signal PWM is fed via the clock input 44 to the first switch 31 and to the current-sink switch 51. In the first clock phase, both switches 31, 51 are closed and in the second clock phase they are open. The current Iled through the electrical load 47 made from light-emitting diodes is thus modulated according to the pulse width-modulated signal PWM and therefore the average brightness is set.

When the control switch 10 is deactivated, a voltage overshoot appears at the input 2 that leads to a current flow through the diode 15 and a quick rise in the output voltage Vdc at the first load terminal 45. This quick rise of the output voltage Vdc is transmitted by means of a series circuit comprising the first and the second capacitor 35, 38 to the feedback voltage Vfb. Thus, the feedback voltage Vfb increases during the second clock phase of the pulse width-modulated signal PWM as long as the output voltage Vdc is increased in the second clock phase. In the first clock phase, the feedback voltage Vfb is set through the low-impedance connection of the second input 22 of the amplifier 20 to the second load terminal 46 to the value of the sink voltage Vsink, so that the series circuit comprising the first and the second capacitor 35, 38 has only a minimal influence on the feedback voltage Vfb.

If the feedback voltage Vfb increases above the reference voltage Vref, another charging process for increasing the output voltage Vdc is initiated by the control arrangement 14 neither in the first nor in the second clock phase. Advantageously, an increase in the output voltage Vdc follows exclusively when the output voltage Vdc is so small that the feedback voltage Vfb is below the value of the reference voltage Vref.

In one alternative embodiment, instead of the diode 15, a second switch 16 is provided that connects the input 2 to the first load terminal 45 and is switched open when the control switch 10 is closed.

In one alternative, not-shown embodiment, the first terminal 32 of the first switch 31 is connected to the first load terminal 45. Here, the connection of the first terminal 32 of the first switch 31 to the second load terminal 46 is unnecessary.

FIG. 2A shows another example embodiment of the sampling device as it can be used in the circuit arrangements according to FIGS. 1A and 1B. The sampling device 30" according to FIG. 2A has the first switch 31 and the first capacitor 35. The second electrode 37 of the first capacitor 35 is connected to the first load terminal 45. A quick increase in the output voltage Vdc is transmitted for an open state of the first switch 31 by means of the first capacitor 35 to the feedback voltage Vfb. Thus, the feedback voltage Vfb increases during the second clock phase of the pulse width-modulated signal PWM as long as the output voltage Vdc is increased in the second clock phase.

FIG. 2B shows another example embodiment of the amplifier as it can be used in the circuit arrangements according to FIGS. 1A and 1B. The amplifier 20' according to FIG. 2B comprises a transconductance amplifier 24. Impedance 65 is connected after this transconductance amplifier. The impedance 65 connects an output 27 of the transconductance amplifier 24 to the reference-potential terminal 8 and is constructed as a low-pass filter. The impedance 65 comprises a capacitor 66 that is connected between the output 27 of the transconductance amplifier 24 and the reference-potential terminal 8 and also a series circuit, made from a resistor 67 and another capacitor 68, that is also connected between the output 27 of the transconductance amplifier 24 and the reference-potential terminal 8. A second input 26 of the transconductance amplifier 24 is connected to the second terminal 33 of the first switch 31 and the output 27 of the transconductance amplifier 24 is connected to the control arrangement 14.

At a first input 25, the reference voltage Vref is fed to the transconductance amplifier 24 and at the second input 26, the feedback voltage Vfb is fed. If the reference voltage Vref is greater than the feedback voltage Vfb, then the transconductance amplifier 24 outputs, on the output side, a positive current Itr that leads to an increase in a voltage on the input of the control arrangement 14. In contrast, if the reference voltage Vref is less than the feedback voltage Vfb, then the transconductance amplifier 24 outputs, on the output side, a negative current Itr that leads to a decrease in the voltage on the input of the control arrangement 14. The voltage is smoothed by the low-pass function of the impedance 65.

FIG. 3 shows an example embodiment of a current-sink arrangement 50. The current-sink arrangement 50 has the current-sink switch 51 and the current source 52 that are connected in series to each other and between the second load terminal 46 and the reference-potential terminal 8. The current source 52 comprises a current mirror 53. The current mirror 53 is constructed as a cascode current mirror and has a first and a second transistor 54, 55 that are connected in series to each other. The series circuit comprising the first and the second transistor 54, 55 couples the current-sink switch 51 to the reference-potential terminal 8. In addition, the current mirror 53 has a third and a fourth transistor 56, 57 that are connected in series to each other and that connect a terminal 58 to the reference-potential terminal 8. The control terminals of the first and the third transistor 54, 56 are connected to each other and to a first terminal of the third transistor 56. Likewise, the control terminals of the second and the fourth transistor 55, 57 are connected to each other and to a first terminal of the fourth transistor 57.

A control current IE is fed to the current mirror 53 at the terminal 58. A value of the load current ILED is proportional to the value of the control current IE multiplied with the magnitude ratio of the first and the second transistor 54, 55 to the third and the fourth transistor 56, 57. The four transistors 54 to 57 are constructed as MOSFETs. They are preferably realized as n-channel MOSFETs. The current-sink switch 51 is similarly preferably realized as an n-channel MOSFET. Advantageously, by means of the current-sink arrangement 50, the current ILED flowing through the electrical load 47 can be limited, so that an overload of the electrical load 47 is avoided. Advantageously, the load current ILED can be set exactly with the current mirror 53 so that a brightness of the light-emitting diodes can be set precisely. Advantageously, the efficiency of the circuit arrangement 1 is increased.

FIG. 4A shows an example embodiment of the first switch 31. The first switch 31 is constructed as an n-channel MOSFET. Alternatively, the first switch 31 can be realized as a p-channel MOSFET.

FIG. 4B shows another example embodiment of the first switch 31. The first switch 31 is realized according to FIG. 4B as a transmission gate and thus comprises a p-channel field-effect transistor 70 and an n-channel field-effect transistor 71 that are both connected at a first terminal to the first terminal 32 of the first switch 31 and at a second terminal to the second terminal 33 of the first switch 31. The clock input 44 is connected directly to a control terminal of the transistor 71 and via an inverter 72 to a control terminal of the transistor 70. Advantageously, due to the construction of the first switch 31 as a transmission gate, a voltage drop across the first switch 31 is small.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A circuit arrangement for voltage conversion comprising:
   a forward branch with a first load terminal connected to an electrical load, wherein the electrical load is adapted to be operated with pulse width modulation, and wherein the forward branch comprises a voltage converter connected on an output side to the first load terminal, and
   a feedback branch with a sampling device for sampling a voltage that can be tapped at the electrical load, wherein the feedback branch is connected to the forward branch,
   wherein the sampling device comprises
      a first switch that is coupled at a first terminal to a second load terminal at which the electrical load is coupled, and
      a first capacitor that is connected at an electrode to a second terminal of the first switch and that is coupled at another electrode to the first load terminal of the forward branch,
   wherein the feedback branch comprises an amplifier that is connected at an input to the second terminal of the first switch,
   wherein the amplifier comprises a transconductance amplifier, and
   wherein the feedback branch comprises an impedance including a low-pass filter connected to an output side of the amplifier.

2. The circuit arrangement according to claim 1, wherein the sampling device is constructed as a sample-hold circuit.

3. The circuit arrangement according to claim 1, wherein the first switch comprises a control terminal that is coupled to a clock input of the circuit arrangement for feeding a pulse width-modulated clock signal to the first switch.

4. The circuit arrangement according to claim 1, wherein the first switch is constructed as a metal-oxide-semiconductor field-effect transistor or as a parallel circuit of an n-channel and a p-channel metal-oxide-semiconductor field-effect transistor.

5. The circuit arrangement according to claim 1, wherein the additional electrode of the first capacitor is coupled by means of a second capacitor to the first load terminal.

6. The circuit arrangement according to claim 1, wherein the additional electrode of the first capacitor is coupled by means of a first resistor to the first load terminal.

7. The circuit arrangement according to claim 1, wherein the additional electrode of the first capacitor is coupled by means of a second resistor to the reference-potential terminal.

8. The circuit arrangement according to claim 5, wherein the amplifier of the feedback branch can be fed a reference voltage at a first input, and wherein the amplifier is coupled at the input, which is a second terminal, to the second terminal of the first switch and at an output to the forward branch.

9. The circuit arrangement according to claim 1, wherein the feedback branch comprises a current-sink arrangement that is coupled to the second load terminal and is designed for pulse width-modulated operation of the electrical load, wherein the electrical load is adapted to be connected between the first load terminal and the second load terminal.

10. The circuit arrangement according to claim 1, wherein the first terminal of the first switch is connected to the second load terminal.

11. The circuit arrangement according to claim 3, wherein
   the feedback branch comprises a current-sink arrangement that is coupled to the second load terminal and is designed for pulse width-modulated operation of the electrical load, wherein the electrical load is adapted to be connected between the first load terminal and the second load terminal, and
   the current-sink arrangement comprises a current-sink switch that is coupled to the clock input of the circuit arrangement for feeding the pulse width-modulated clock signal to the current-sink switch.

12. The circuit arrangement according to claim 9, wherein the current-sink arrangement comprises a current mirror.

13. The circuit arrangement according to claim 1, wherein the forward branch is adapted for up conversion of a direct-current voltage.

14. The circuit arrangement according to claim 1, wherein the forward branch comprises:
   an input for coupling to a power source,
   a control switch with a first terminal that is coupled to the input and with a second terminal that is coupled to the reference-potential terminal, and
   a control arrangement that is coupled, on the input side, to the feedback branch and, on the output side, to a control terminal of the control switch.

15. The circuit arrangement according to claim 3, wherein a period length of a control signal that is fed to the control terminal of the control switch is independent of a period length of the pulse width-modulated clock signal.

16. The circuit arrangement according to claim 14, wherein the forward branch comprises a diode or a second switch that are connected between the input and the first load terminal.

17. The voltage converter comprising a circuit arrangement according to claim 14 and an inductor that is coupled between a power source and the input of the circuit arrangement.

18. A method for voltage conversion comprising the steps of:
   providing a pulse width-modulated supply of an electrical load by means of feeding an output voltage to the electrical load, wherein the output voltage is provided by a voltage converter connected to the electrical load via a first load terminal, sampling, by a first switch that is fed with a pulse width-modulated clock signal via a clock input, a feedback voltage that can be tapped at a second load terminal of the electrical load in a first clock phase during which the electrical load is supplied with electrical energy, increasing the value of the sampled feedback voltage in a second clock phase during which the electrical load is not supplied with electrical energy, as long as the output voltage is increased in the second clock phase, controlling the voltage conversion as a function of the feedback voltage, and modulating, by a current sink arrangement coupled via the second load terminal to the electrical load and connected to the clock input at which the pulse width-modulated clock signal is provided, a load current flowing through the electrical load in pulse width form, wherein the pulse width-modulated clock signal comprises the first clock phase and the second clock phase.

19. The method according to claim 18, comprising increasing the value of the feedback voltage in the second clock phase approximately by a value of a voltage increase of the output voltage during the second clock phase.

20. The method according to claim 18, comprising the steps of:

charging an inductor with electrical energy by switching a control switch that is connected in series to the inductor between a power source and a reference-potential terminal into a low-impedance operating state, and discharging electrical energy stored in the inductor to an electrical load by switching the control switch into a high-impedance operating state.

21. The method according to claim 18, comprising independent setting of a period length of a control signal that is fed to the control switch and a period length of the pulse width-modulated clock signal with which the electrical load is operated.

22. A circuit arrangement for voltage conversion comprising:

a forward branch with a first load terminal connected to an electrical load, wherein the electrical load is adapted to be operated with pulse width modulation, the forward branch providing an output voltage to the electrical load at the first load terminal, and a feedback branch with a sampling device for sampling a voltage that can be tapped at the electrical load, wherein the feedback branch is connected to the forward branch, wherein the sampling device comprises a first switch that is coupled at a first terminal to a second load terminal at which the electrical load is coupled, and a first capacitor that is connected at an electrode to a second terminal of the first switch and that is coupled at another electrode to the first load terminal of the forward branch, wherein the first switch comprises a control terminal that is connected to a clock input of the circuit arrangement, wherein a pulse width-modulated clock signal is fed to the circuit arrangement via the clock input, and wherein the feedback branch comprises a current-sink arrangement that is coupled via the second load terminal to the electrical load and is connected to the clock input.

23. A circuit arrangement for voltage conversion comprising:

a forward branch with a first load terminal adapted to be coupled to an electrical load, wherein the electrical load is adapted to be operated with pulse width modulation, and a feedback branch with a sampling device for sampling a voltage that can be tapped at the electrical load, wherein the feedback branch is connected to the forward branch, wherein the sampling device comprises a first switch that is coupled at a first terminal to the first load terminal or a second load terminal at which the electrical load can be coupled, and a first capacitor that is connected at an electrode to a second terminal of the first switch and that is coupled at another electrode to the first load terminal of the forward branch, wherein the feedback branch comprises a current-sink arrangement that is coupled to the second load terminal and is designed for pulse width-modulated operation of the electrical load, wherein the electrical load is adapted to be connected between the first load terminal and the second load terminal.

* * * * *